United States Patent
Protais (10) Patent No.: US 10,343,327 B2
(45) Date of Patent: Jul. 9, 2019

(54) MEASUREMENT OF THE BOXING TRAVEL BY THE STRETCHING FUNCTION, IN AN INSTALLATION FOR PRODUCING CONTAINERS

(71) Applicant: SIDEL PARTICIPATIONS, Octeville-sur-Mer (FR)

(72) Inventor: Pierrick Protais, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 222 days.

(21) Appl. No.: 15/325,509

(22) PCT Filed: Jul. 2, 2015

(86) PCT No.: PCT/FR2015/051828
§ 371 (c)(1),
(2) Date: Jan. 11, 2017

(87) PCT Pub. No.: WO2016/005682
PCT Pub. Date: Jan. 14, 2016

(65) Prior Publication Data
US 2017/0157834 A1 Jun. 8, 2017

(30) Foreign Application Priority Data
Jul. 11, 2014 (FR) .................... 14 56739

(51) Int. Cl.
*B29C 49/12* (2006.01)
*B29C 49/48* (2006.01)
(Continued)

(52) U.S. Cl.
CPC .............. *B29C 49/78* (2013.01); *B29C 49/12* (2013.01); *B29C 49/4815* (2013.01);
(Continued)

(58) Field of Classification Search
CPC ..... B29C 49/78; B29C 49/4815; B29C 49/12; B29C 2049/4892; B29C 2049/129;
(Continued)

(56) References Cited

U.S. PATENT DOCUMENTS 3,425,096 A * 2/1969 Morse ............... B29C 45/50
264/328.14
3,949,033 A 4/1976 Uhlig
(Continued)

FOREIGN PATENT DOCUMENTS

DE 24 50 696 A1 5/1975
FR 2 975 332 A1 11/2012
(Continued)

OTHER PUBLICATIONS

International Search Report, dated Oct. 7, 2015, from corresponding PCT Application.

*Primary Examiner* — Ziaul Karim
(74) *Attorney, Agent, or Firm* — Young & Thompson (57) ABSTRACT

Disclosed is a method for parametrizing a facility for producing containers including: a mold having a movable mold bottom, a movable drawing rod and an electric machine coupled with the rod; from a configuration in which the rod is in a raised position and in the bottom in an extended position, operating the electric machine as a motor; assessing the resultant of the axial forces on the rod; when a variation is detected in the resultant of the forces, assigning an initial position to the rod; controlling the movement of the mold bottom towards the retracted position thereof; assigning to the rod the corresponding so-called final position of the rod; and calculating the difference between the final position and the initial position.

20 Claims, 7 Drawing Sheets

(51) Int. Cl.
  *B29C 49/78* (2006.01)
  *B29K 67/00* (2006.01)
  *B29L 31/00* (2006.01)
  *G05B 19/27* (2006.01)
  *B29K 105/00* (2006.01)
  *G05B 19/406* (2006.01)

(52) U.S. Cl.
  CPC ........... *G05B 19/27* (2013.01); *G05B 19/406* (2013.01); *B29C 2049/129* (2013.01); *B29C 2049/4892* (2013.01); *B29C 2949/7805* (2013.01); *B29C 2949/78344* (2013.01); *B29C 2949/78495* (2013.01); *B29K 2067/003* (2013.01); *B29K 2105/258* (2013.01); *B29L 2031/712* (2013.01); *G05B 2219/49025* (2013.01)

(58) Field of Classification Search
  CPC .......... B29C 2949/78344; B29C 2949/78495; B29C 2949/7805; G05B 19/406; G05B 19/27; G05B 2219/49025; B29K 2105/258; B29K 2067/003; B29L 2031/712
  USPC ...................................................... 700/197
  See application file for complete search history.

(56) References Cited

U.S. PATENT DOCUMENTS

| | | | | |
|---|---|---|---|---|
| 5,785,921 | A * | 7/1998 | Outreman | B29C 49/48 264/529 |
| 2004/0084809 | A1* | 5/2004 | Vanderploeg | B29C 37/0007 264/334 |
| 2008/0047964 | A1* | 2/2008 | Denner | B29C 49/06 220/624 |
| 2014/0026522 | A1* | 1/2014 | Melrose | B65B 61/24 53/440 |
| 2014/0145378 | A1 | 5/2014 | Deau et al. | |
| 2014/0203481 | A1* | 7/2014 | Derrien | B29C 49/12 264/532 |

FOREIGN PATENT DOCUMENTS

| | | |
|---|---|---|
| WO | 2012/156614 A2 | 11/2012 |
| WO | 2012/156638 A1 | 11/2012 |

* cited by examiner

FIG.7

MEASUREMENT OF THE BOXING TRAVEL BY THE STRETCHING FUNCTION, IN AN INSTALLATION FOR PRODUCING CONTAINERS

The invention relates to the parameterization of facilities for manufacturing containers by stretch blow molding of blanks made of plastic material, for example polyethylene terephthalate (PET).

BACKGROUND OF THE INVENTION

Ordinarily, a container comprises a body, a bottom closing the body at its lower end, and a neck that opens at an upper end of the body to make possible the filling and emptying of the container.

A standard technique for manufacturing containers is blow molding. This technique consists in introducing the blank (i.e., a preform or an intermediate container that has undergone a preforming operation), previously heated to a temperature that is greater than the glass transition temperature of the material (about 80° C. in the case of PET), in a mold provided with a wall that defines a cavity bearing the impression of the container, and in injecting into the blank, through the neck, a fluid, such as a gas (generally air), under pressure to press the material against the wall of the mold.

Under the effect of pressure, the material softened by the heat forms a bubble that inflates and expands both in an axial direction, parallel to the main axis of the mold, and in a radial direction, perpendicular to the axis of the mold.

To prevent any axis deviation of the container and to ensure a good distribution of the material, the axial stretching of the blank is forced by means of a rod that can be moved axially in the mold, this rod comprising a distal end that pushes the bottom of the blank away until it presses it against a mold bottom bearing the impression of the bottom of the container. This technique is called stretch blow molding.

For certain applications, it is known that the mold bottom is movable relative to the wall between an extended position in which the mold bottom is withdrawn relative to the cavity, and a retracted position in which the mold bottom closes the cavity. Initially in withdrawn position, the mold bottom is moved toward its deployed position during the forming of the container.

This technique, called "boxing" and described in detail in the French patent application FR 2 975 332 or its international equivalent WO 2012/156638 (both in the name of Sidel Participations), makes it possible to increase the stretch ratio of the material and has the dual advantage of structurally reinforcing the bottom of the container and of improving the taking of its impression.

The technique of boxing is complex because, depending on the shape and depth of the reliefs (also called reserves) to be made on the bottom of the container, the push-back carried out by the mold bottom can lead to a thinning of the material, even to a local break in the wall of the container in the area of its bottom, which makes it unusable. This is why the adjustment of the manufacturing machines including the boxing function is challenging; it is generally entrusted to experienced operators whose technique makes it possible with judgment to achieve containers that conform. It is then difficult, however, to obtain a consistent quality for the containers, each operator having his own technique. Furthermore, since experienced operators are not always available to correct the adjustments, it is sometimes necessary to stop the production line to avoid the accumulation of containers that do not conform.

During a change in reference (in other words, container model) on the machine, the operator can be led to change certain parameters connected with the boxing, particularly the boxing travel, i.e., the distance separating the retracted position of the mold bottom from its extended position.

Such a modification, if it is not performed correctly, can lead to malformations that affect the containers.

This causes the stopping of the installation, subsequent to the awareness by the operator of a recurring defect affecting the containers manufactured and a scrapping of the containers manufactured between the start of production and the stopping of the installation.

A first objective is therefore to propose a solution that makes it possible to improve the quality of the containers produced.

A second objective is to propose a solution that makes it possible to limit the risks of malformation of the containers, particularly in the area of their bottoms.

A third objective is to limit, indeed prevent, the parameterizing errors during the changes in reference on the installations for manufacturing the containers.

SUMMARY OF THE INVENTION

For this purpose, a method is proposed for parameterizing an installation for manufacturing containers by stretch blow molding from blanks made of plastic material, this installation comprising:
  a mold equipped with a wall defining a cavity bearing the impression of the container, extending along a main axis of the mold and with a mold bottom that can move axially in relation to the wall between an extended position and a retracted position,
  a device for controlling the movement of the mold bottom, able to exert an axial thrust on the mold bottom to move it from its extended position to its retracted position and vice versa;
  a stretching device comprising a stretching rod that is movable axially in relation to the wall and an electric machine that is connected to the rod;
this method comprising the operations consisting, from an initial configuration in which the rod is in a raised position away from the mold bottom and in which the mold bottom is in its extended position or in its retracted position, in:
  causing the electric machine to operate as a motor to exert on the rod an axial driving force that moves it toward the mold bottom;
  evaluating the result of the axial forces exerted on the rod;
  provided that a variation in the result of the forces is detected, assigning a position of origin to the rod;
  storing the position of origin;
  actuating the movement of the mold bottom toward its retracted position or, respectively, its extended position;
  assigning the corresponding, so-called final, position, of the rod to the rod;
  calculating and storing the difference, called travel of the rod, between the final position and the position of origin.

Since the travel of the rod is equal to the travel of the mold bottom, this method makes it possible to verify, prior to the start of production, the travel of the mold bottom and therefore to prevent errors affecting the adjustments made by the operator from affecting production.

Various additional characteristics can be foreseen, individually or in combination:

in the initial configuration, the mold bottom is in its extended position;

between the operation for storing the position of origin and the actuation of movement of the mold bottom, an operation is envisaged consisting in repositioning the rod in raised position;

after the operation for actuation of movement of the mold bottom, operations are envisaged consisting in:

with the electric machine that is operating as a motor, moving the rod from its raised position to the mold bottom;

evaluating the result of the axial forces exerted on the rod;

provided that a variation in the result of the forces is detected, assigning its final position to the rod;

between the operation for storing the position of origin and the actuation of movement of the mold bottom, an operation is envisaged that consists in ceasing to apply the axial driving force on the rod;

the cessation of the application of the axial driving force on the rod is performed by the cessation of the operation of the electric machine as a motor;

after the cessation of the use of the electric machine as a motor and before the actuation of movement of the mold bottom, the electric machine is switched to operate as a generator;

after the actuation of movement of the mold bottom, a predetermined time delay is envisaged;

an operation of comparing the travel of the rod with a predetermined theoretical value is envisaged;

the evaluation of the result of the axial forces exerted on the rod is performed by the measurement of the current consumed by the electric machine that is operating as a motor, and the detection of a variation in the result of the forces exerted on the rod is performed by the detection of a variation in the current consumed by the electric machine that is operating as a motor.

BRIEF DESCRIPTION OF THE DRAWINGS

Other objects and advantages of the invention will appear in light of the description of an embodiment, made below with reference to the accompanying drawings in which:

FIGS. 5, 6 and 7 are diagrams on which are drawn, from top to bottom and according to three embodiments:

a curve illustrating the variations of vertical position of the rod;

a timetable illustrating the actuation of movement of the mold bottom;

a curve illustrating the variations of the forces applied to the rod;

a curve illustrating the variations of the electric current consumed by the electric machine to which the rod is connected.

DETAILED DESCRIPTION OF THE PREFERRED EMBODIMENTS

Figure 1:
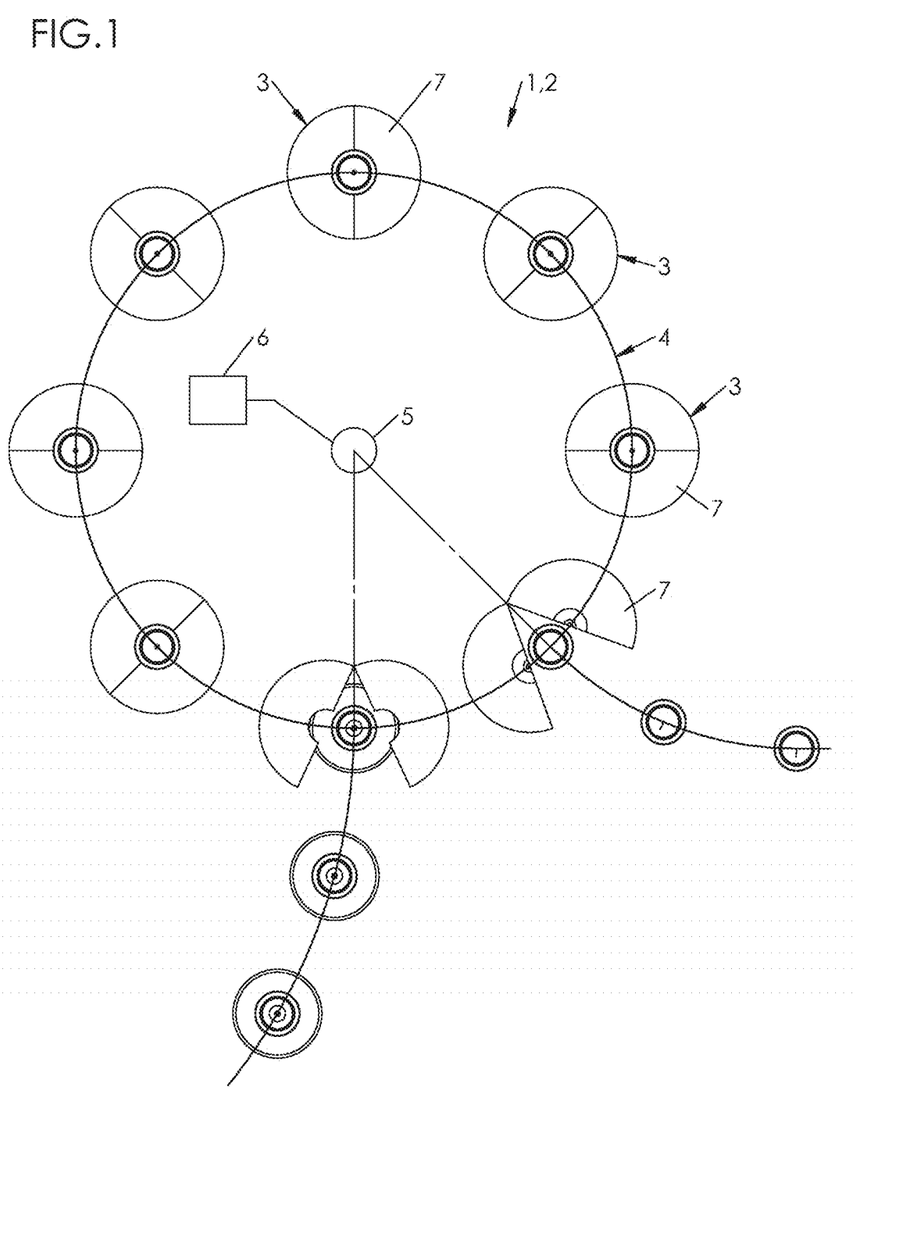
FIG. 1 is a diagrammatic view of a machine for producing containers by stretch blow molding from preforms made of plastic material, this machine being equipped with a plurality of forming stations.

Partially shown in FIG. 1 is an installation 1 for manufacturing containers by stretch blow molding from blanks made of plastic material (particularly PET). The blanks can be preforms, formed by injection of the plastic material, or even intermediate containers formed from blanks but that, not having the shape of the final containers, are intended to undergo one or more finishing operations, including a blow-molding operation.

This installation 1 comprises a thermal conditioning unit, in which the blanks pass to be heated there at a temperature that is greater than the glass transition temperature of the material (about 80° C. for PET), and a forming unit 2 (diagrammed in FIG. 1) toward which the blanks are transferred from the thermal conditioning unit to be shaped by stretch blow molding.

As diagrammed in FIG. 1, the forming unit 2 comprises at least one station 3 for forming a container by stretch blow molding. In practice, the forming unit 2 in fact comprises a rotating carousel or wheel 4, and a series of forming stations 3 mounted on the wheel 4, on the periphery thereof.

According to a preferred embodiment, the forming unit 2 comprises a sensor 5 of the instantaneous angular position of the wheel, in the form of, for example, an encoder (i.e., in practice, an instrumented bearing).

The installation comprises a control system that automatically manages its operation, in the form of a computerized central control unit 6, and controllers (for example of the PLC type—acronym for Programmable Logic Controller) equipped with actuators that individually manage each forming station 3.

Each forming station 3 comprises, firstly, a mold 7 equipped with a wall 8 that defines a cavity 9 bearing the impression of the container to be formed, which extends along a main axis 10, and with a mold bottom 11 equipped with an upper surface 12 bearing the impression of the bottom of the container to be formed.

The mold 7 is, for example, of the wallet type and comprises two half-molds that are articulated around a common hinge and that open to make possible, sequentially, the removal of a formed container and the introduction of a preform that is previously heated in the thermal conditioning unit.

Figure 2:
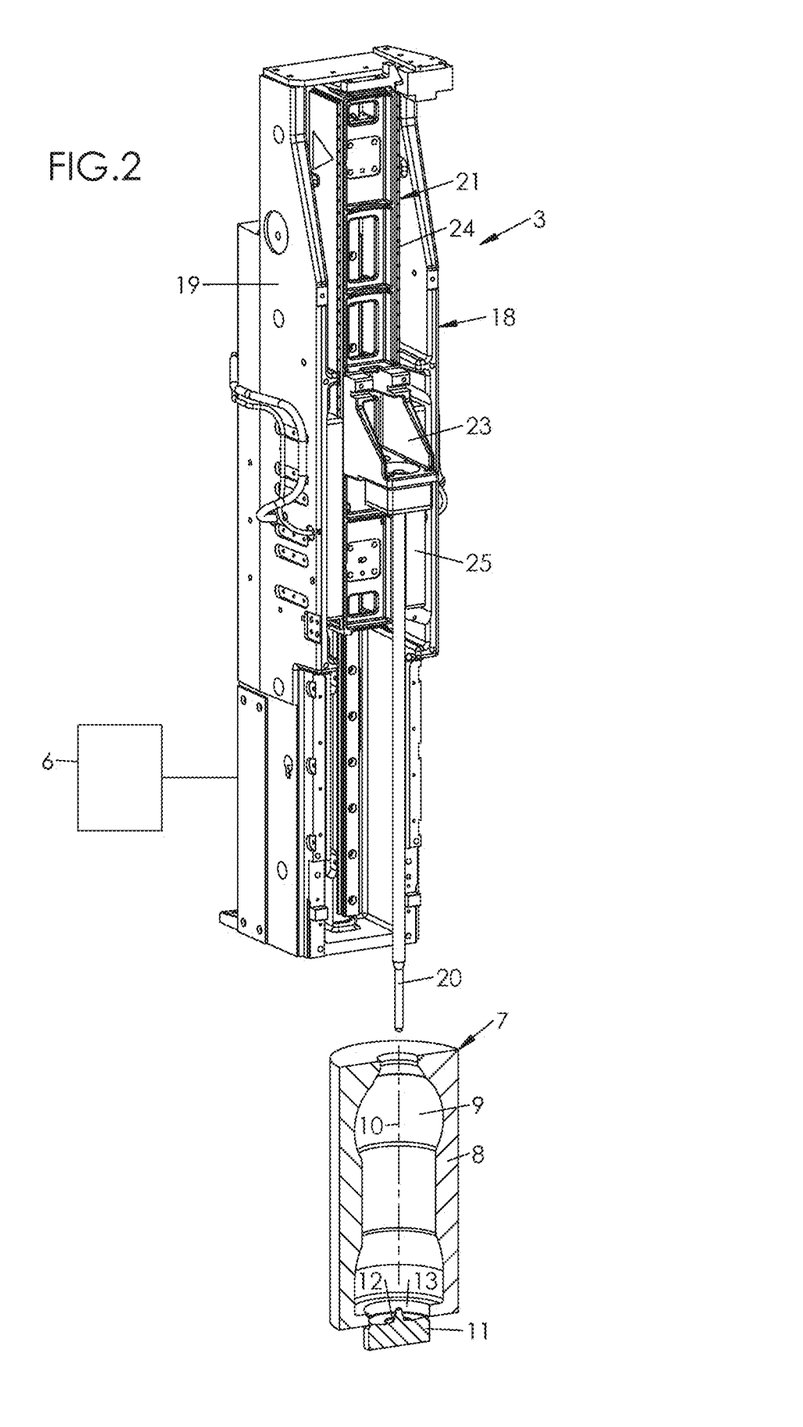
FIG. 2 is a partial perspective view illustrating a forming station equipping a machine as diagrammed in FIG. 1.
Figure 3:
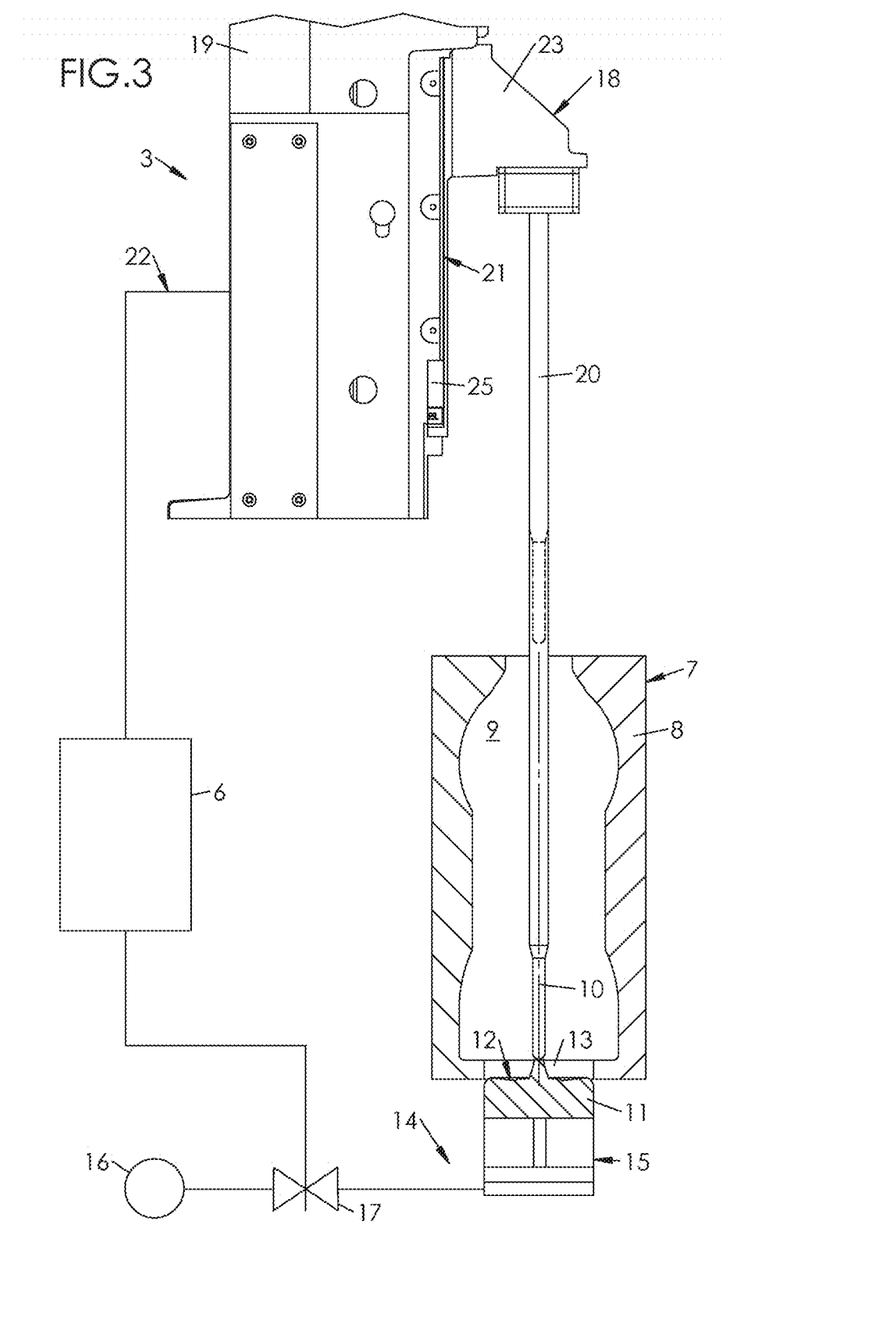
FIGS. 3 and 4 are detail views illustrating the forming station in two different positions of the stretching rod.
Figure 4:
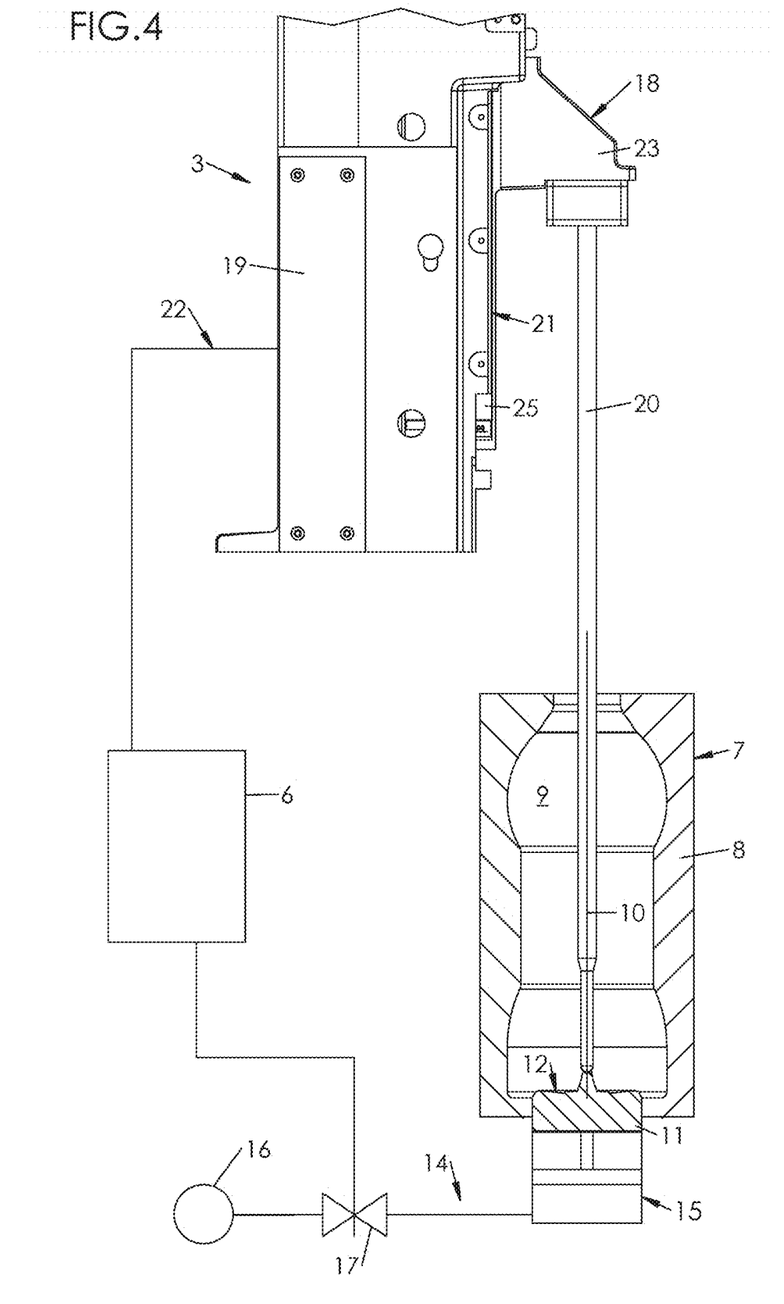

The wall 8 has, in a lower part, an opening 13 defining a passage for the mold bottom 11, which is mounted to move axially in relation to the wall 8 between:

an extended position, in which the mold bottom 11 is spaced apart from the cavity 9 (FIGS. 2, 3), and a retracted position in which the mold bottom 11 closes the cavity 9 by sealing the opening 13, the upper surface 12 thus completing the impression of the container to be formed (FIG. 4).

The movability of the mold bottom 11 makes it possible, during a boxing operation consisting in, from the extended position, moving the mold bottom 11 toward its retracted position during the blow molding of the container, to perform on its bottom a considerable stretching of the material that, by increasing its crystallinity, exhibits an increased structural rigidity.

Each forming station 3 comprises, secondly, a device 14 for actuating the movement of the mold bottom 11, able to exert on it an axial thrust to move it from its extended position to its retracted position, and vice versa.

This actuating device 14 comprises, for example, a jack 15 on which the mold bottom 11 is mounted, this cylinder 15 being connected to a fluid source 16 (for example at a pressure used to carry out the blow molding of the containers) by means of a solenoid valve 17 managed by the central control unit 6.

Each forming station 3 comprises, thirdly, a stretching device 18 equipped with a frame 19 that is attached to the wheel 4 and that extends approximately directly above the mold 7.

The stretching device 18 comprises a stretching rod 20 that is movable relative to the frame 19 (and therefore relative to the mold 7) and intended to hold the container during forming in the axis 10 of the mold 7, as well as an electric machine 21 connected to the rod 20 to ensure its movement, under certain conditions. The electric machine 21 is connected to the central control unit 6 that ensures its control by supplying alternating current via an electric circuit 22.

More specifically, according to an embodiment illustrated in the figures, the stretching device 18 comprises a carriage 23 mounted to slide relative to the frame 19, and on which the rod 20 is attached by an upper end.

The electric machine 21 is, for example, a linear (asynchronous) induction motor comprising:
- a linear stator 24 integral with the frame 19, supplied with current to produce a magnetic field under the control of the central control unit 6,
- a linear rotor 25 integral with the carriage 23, mounted opposite the stator 24 and formed by, for example, a plate made of a metal material such as copper, iron or aluminum.

By means of the carriage 23, the rod 20 is thus mounted to move relative to the frame 19 (and therefore relative to the mold 7) between
- a raised end position (FIG. 2 and in dashed lines in FIG. 3) in which the rod 20 is completely extended from the mold 7,
- a low end position (in solid lines in FIG. 3) in which the rod 20 is received in the mold 7 while coming into contact with the mold bottom 11, itself being in extended position.

The electric machine 21 can operate in two modes:
- a driving mode, in which the machine 21 is supplied with current, the stator 24 then producing a magnetic field that, by induction, generates on the rotor 25 (and on the carriage 23 and the rod 20) an electromotive force that tends to move it;
- a generating mode, in which the supply of alternating current to the stator 24 is cut, and in which the forced movement of the rod 20 (and therefore of the carriage 23) creates conversely in the rotor 25 a magnetic field that induces an electric current in the electric circuit 22 for supplying the stator 24, which in turn generates a magnetic field in the stator 24 and a counter-electromotive force that opposes the forced movement of the rod 20.

The distance separating the extended position from the retracted position of the mold bottom 11 is named the boxing travel. The boxing travel varies from one container to the next, particularly in the shape of the bottom and the diameter (which itself depends on the capacity) of the container.

Theoretically, the boxing travel is adjusted manually by the operator responsible for the parameterizing of the installation 1. This adjustment can, for example, be carried out directly in the area of the jack 15 by mounting or by adjustment of end-of-travel stops.

It is not enough, however, to parameterize the installation by making the assumption that each forming station 3 has been correctly adjusted. Actually, the operator may have committed an error on at least one of the forming stations 3, or even have forgotten to initiate the adjustment during a change in reference of the container to be manufactured.

This is why it is desirable to determine the boxing travel for each forming station 3 prior to the start of production, so as to verify that this travel corresponds to a predefined theoretical travel (and, for example, stored in the central control unit 6) for which the production of the containers can be considered optimal.

It is theoretically possible to instrument the mold bottom 11 directly to identify the position of the bottom 11 in extended position and in retracted position and thus to deduce from it, by difference, the boxing travel. However, in many configurations of the installation, the environment of the mold bottom 11 is not very conducive to such an instrumentation, because of in particular vibrations to which the mold bottom 11 and its jack 15 are subject, as well as unfavorable thermal conditions (high or fluctuating temperature), or even possible moisture resulting from fluid leaks (even minimal) in the fittings between the mold 7 and supply circuits of heat exchange fluid intended to heat the wall 8 and/or the mold bottom 11.

This is why, during the parameterizing of the installation 1, it is envisaged to calculate the boxing travel of each forming station 3, prior to the start of production, by means of its stretching rod 20, to verify, by simple comparison, its conformity to the predefined theoretical travel.

Thus, the parameterizing of the installation 1, including the verification of the boxing travel, is performed as follows.

In brief, starting from the raised end position:
- the rod 20 is brought into contact with the mold bottom 11, which is in its extended position or in its retracted position;
- a so-called position of origin is assigned to the rod 20;
- the movement of the mold bottom 11 is actuated;
- by ensuring the contact of the rod 20 with the mold bottom 11 after its movement, the corresponding position of the rod 20 is then determined;
- then the space between the raised position of the rod 20 and the position of origin is calculated, which provides the distance traveled by the rod 20 during the movement of the mold bottom 11, and therefore the boxing travel.

In practice, this can be achieved in several different ways. Below, three of them are presented, with reference respectively to FIGS. 5, 6 and 7.

A first embodiment (FIG. 5) is described, starting with an initial configuration in which the rod 20 (whose position is denoted Z on the axis running vertically upwards) is in a raised position away from the mold bottom 11 (in practice, in its raised end position) and in which the mold bottom 11 is in its extended position.

Figure 5:
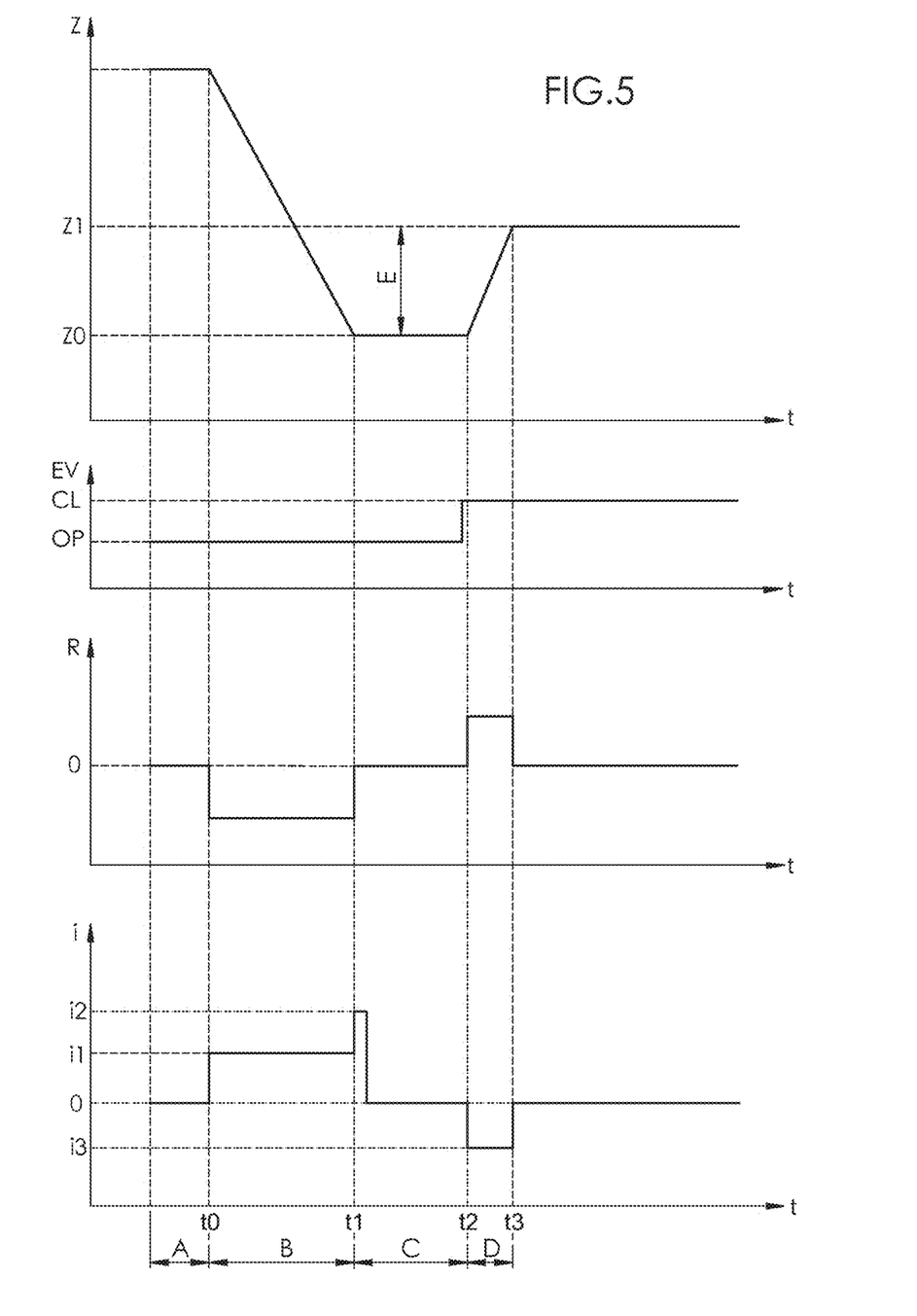

In FIG. 5, the diagrams are drawn on reference points whose horizontal axis is an axis of times (denoted t). During steady operation of the installation 1, the time is relative and represents the angular position of the wheel 4, which is measured thanks to the angular position sensor 5. It will be noted that the diagrams of FIG. 5 are provided to illustrate the different phases of the method, but do not necessarily correspond to measurements taken. Thus, the same is true, in particular, of the position of the rod 20.

The initial configuration corresponds to the zone A on the synchronized diagrams of FIG. 5. The solenoid valve 17 for actuation of the movement of the mold bottom 11 (the position of the solenoid valve 17 is denoted EV in the diagram of FIG. 5) is closed (position CL); the current (denoted i) consumed by the electric machine 21 is zero. The result (denoted R) of the axial forces exerted on the rod 20 is zero.

Starting from this initial configuration, from a time t0, the electric machine 21 is operated as a motor, supplying the stator 24 with alternating electric current to exert on the carriage 23 (and therefore the rod 20) an axial driving force that moves it downward (i.e., toward the mold bottom 11), which corresponds to the zone B in the diagrams of FIG. 5.

Then, the result of the axial forces exerted on the rod 20 is evaluated. In practice, this evaluation consists in measuring the value of the current consumed by the electric machine 21 operating as a motor. As long as the rod 20 encounters no obstacle on its descent, the consumed current is constant and corresponds to nominal operating current (denoted i1) of the machine 21, necessary for the movement of the rod 20.

When the rod 20 reaches, at the time t1, the upper surface 12 of the mold bottom 11, the mold bottom forms a stop and prevents any advance of the rod 20. The result of the axial forces on the rod 20 then varies suddenly to be nullified, the force exerted by the mold bottom 11 on the rod 20 being equal in absolute value to the force exerted by the motor formed by the machine 21 on the rod 20 but of opposite sign.

This is reflected by a variation in the current consumed by the electric machine 21 operating as a motor. More precisely, the consumed current increases suddenly. The maximum attained value is denoted i2. As soon as this variation of the consumed current is detected, the following operations are performed, their order mattering little (these operations can even be simultaneous):

- a position of origin Z0 (which can have a zero value), which here corresponds to the low position of the mold bottom 11, is assigned to the rod 20, and this position is stored in memory (for example in a memory incorporated into the central control unit 6);
- application of the axial driving force on the rod 20 is ceased, in this particular case by ceasing to cause the electric machine 21 to operate as a motor (in other words, by ceasing to supply it with electric current), and its operation is switched to generator mode.

This phase is denoted C in the diagrams of FIG. 5.

The movement of the mold bottom 11 toward its retracted position is then actuated by opening the solenoid valve 17 (position OP in FIG. 5). In the absence of force exerted by the electric machine 21 on the rod 20, the mold bottom 11 drives it in its movement, from the time t2 (that has been shown slightly after the actuation of movement of the mold bottom 11, to mark the response time of the solenoid valve 17).

However, the rod 20 is not completely free since, as we have seen, its movement creates in the electric supply circuit 22 of the machine 21 an induced current that generates a counter-electromotive force, directed axially in the opposite direction of the force exerted by the mold bottom 11 but considerably weaker, in absolute value, than this one. This phase is denoted D in the diagrams of FIG. 5. It can be seen that instead of consuming current, the machine 21 produces it (the value of the current thus produced is denoted i3).

Then, the corresponding final position, denoted Z1, of the rod 20 is determined, and then the distance E (called travel of the rod) between this final position and the position of origin of the rod 20 is calculated and stored in memory:

$$E = |Z1 - Z0|$$

If the time, denoted $t_3$, where the mold bottom 11 reaches its retracted position, is not known, its minimal value can nevertheless be estimated by taking into account the times found by means of previous boxing tests.

A predetermined time delay can therefore be provided, from the time t2, which precedes the determination of the position of the rod 20 that is supposed to correspond to the end of travel of the mold bottom 11.

The value thus calculated of the distance E then corresponds to the boxing travel, starting with the hypothesis (generally verified in practice) that the rod 20 is held in continuous contact with the mold bottom 11.

Figure 6:
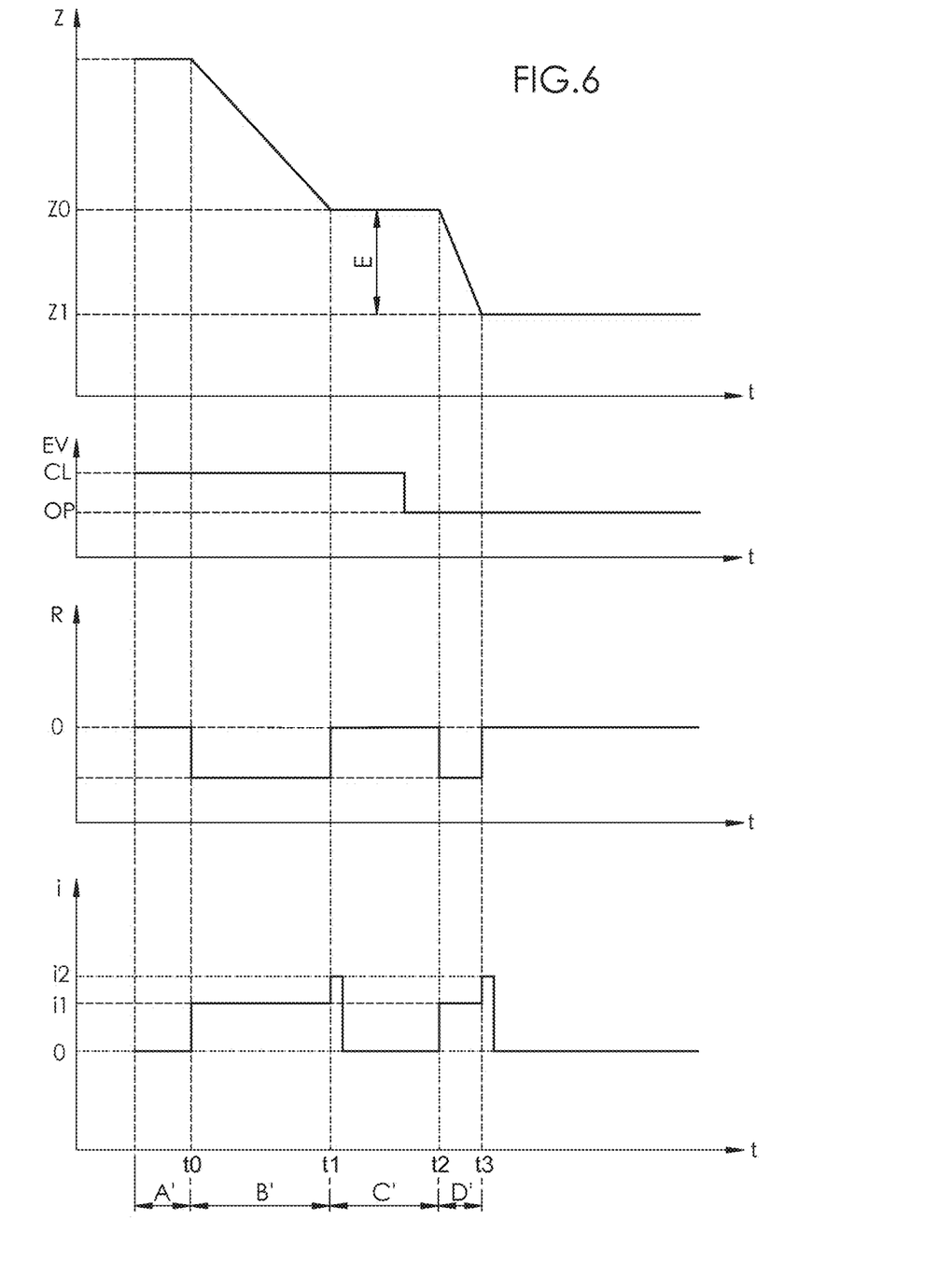

A second embodiment is now described, starting with an initial configuration in which the rod 20 is in a raised position away from the mold bottom 11 (in practice, in its raised end position) and in which the mold bottom 11 is in its retracted position.

In FIG. 6, constructed in the same way as FIG. 5, the diagrams are drawn on reference points whose horizontal axis is an axis of times (denoted t). During steady operation of the installation 1, the time is relative and represents the angular position of the wheel 4, which is measured thanks to the angular position sensor 5.

The initial configuration corresponds to the zone A' in the synchronized diagrams of FIG. 6. The solenoid valve 17 for actuation of the movement of the mold bottom 11 is open (position OP); the current consumed by the electric machine 21 is zero. The result of the axial forces exerted on the rod 20 is zero.

Starting from this initial configuration, from the time t0, the electric machine 21 is operated as a motor, supplying the stator 24 with alternating electric current to exert on the carriage 23 (and therefore the rod 20) an axial driving force that moves it downward (i.e., toward the mold bottom 11), which corresponds to the zone B' in the diagrams of FIG. 6.

Then, the result of the axial forces exerted on the rod 20 is evaluated. In practice, this evaluation consists in measuring the value of the current consumed by the electric machine 21 operating as a motor. As long as the rod 20 encounters no obstacle on its descent, the consumed current is constant and corresponds to nominal operating current (denoted i1) of the machine 21, necessary for the movement of the rod 20.

When the rod 20 reaches, at the time t1, the upper surface 12 of the mold bottom 11, the mold bottom forms a stop and prevents any advance of the rod 20. The result of the axial forces on the rod 20 then varies suddenly to be nullified, the force exerted by the mold bottom 11 on the rod 20 being equal in absolute value to the force exerted by the motor formed by the machine 21 on the rod 20 but of opposite sign.

This is reflected by a variation in the current consumed by the electric machine 21 operating as a motor. More precisely, the consumed current increases suddenly. The maximum attained value is denoted i2. As soon as this variation of the consumed current is detected, the following operations are performed, their order mattering little (these operations can even be simultaneous):

- a position of origin Z0 (which can have a zero value), which here corresponds to the raised position of the mold bottom 11, is assigned to the rod, and this position Z0 is stored in memory (for example in a memory incorporated into the central control unit 6);
- application of the axial driving force on the rod 20 is ceased, in this particular case by ceasing to cause the electric machine 21 to operate as a motor (in other words, by ceasing to supply it with electric current), and its operation is switched to generator mode.

This phase is denoted C' in the diagrams of FIG. 6.

The movement of the mold bottom 11 toward its extended position is then actuated by closing the solenoid valve 17 (position CL in FIG. 6). After a time delay, taking into account the response time of the solenoid valve 17 and the presumed time of movement of the mold bottom 11, the electric machine 21 is again operated as a motor, from the time t2, supplying the stator 24 with alternating electric current to exert on the carriage 23 (and therefore the rod 20) an axial driving force that moves it downward (i.e., toward the mold bottom 11), which corresponds to the zone C'.

The result of the axial forces exerted on the rod 20 is evaluated in the same way as before. As long as the rod 20 encounters no obstacle on its descent, the consumed current is constant and corresponds to nominal operating current (denoted i1) of the machine 21, necessary for the movement of the rod 20.

When the rod 20 reaches, at the time t3, the upper surface 12 of the mold bottom 11, the mold bottom forms a stop and prevents any advance of the rod 20. The result of the axial forces on the rod 20 then varies suddenly to be nullified, the force exerted by the mold bottom 11 on the rod 20 being equal in absolute value to the force exerted by the motor 21 on the rod 11 but of opposite sign. This phase is denoted D' in FIG. 6.

This is reflected by a variation in the current consumed by the electric machine 21 operating as a motor. More precisely, the consumed current increases suddenly. The value i2 is the same as before. As soon as this variation of the consumed current is detected, the following operations are performed, their order mattering little (these operations can even be simultaneous):

a final position Z1, which corresponds here to the extended position of the mold bottom 11, is assigned to the rod, and this position Z1 is stored in memory (for example in a memory incorporated into the central control unit 6);

application of the axial driving force on the rod 20 is ceased, in this particular case by ceasing to cause the electric machine 21 to operate as a motor (in other words, by ceasing to supply it with electric current), and its operation is switched to generator mode.

Then, the distance E (called travel of the rod) between this final position and the position of origin of the rod 20 is calculated and stored in memory, which corresponds to the boxing travel:

$$E = |Z1 - Z0|$$

A third embodiment (FIG. 7) is described, starting with an initial configuration in which the rod 20 (whose position is denoted Z on the vertical axis going up) is in a raised position away from the mold bottom 11 (in practice, in its raised end position) and in which the mold bottom 11 is in its extended position (but, in a variant, it could be in the retracted position).

Figure 7:
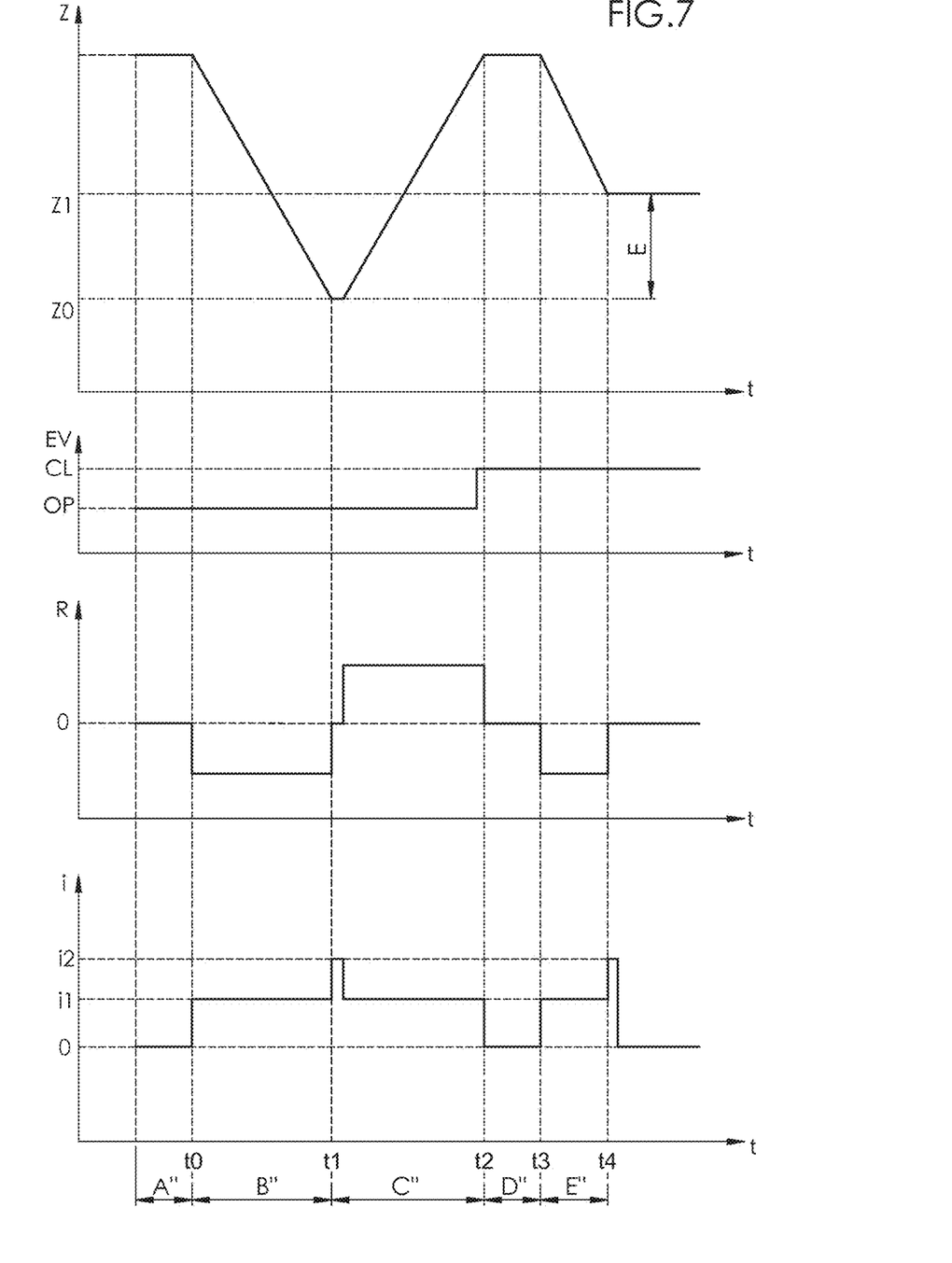

In FIG. 7, the diagrams are drawn on reference points whose horizontal axis is an axis of times (denoted t). During steady operation of the installation 1, the time is relative and represents the angular position of the wheel 4, which is measured thanks to the angular position sensor 5. It will be noted that the diagrams of FIG. 7 are provided to illustrate the different phases of the method, but do not necessarily correspond to measurements taken. Thus, the same is true, in particular, of the position of the rod 20.

The initial configuration corresponds to the zone A" in the synchronized diagrams of FIG. 7. The solenoid valve 17 for actuation of the movement of the mold bottom 11 (the position of the solenoid valve 17 is denoted EV in the diagram of FIG. 7) is closed (position CL) (in a variant, the solenoid valve 17 could be open (position OP)); the current (denoted i) consumed by the electric machine 21 is zero. The result (denoted R) of the axial forces exerted on the rod 20 is zero.

Starting from this initial configuration, from a time t0, the electric machine 21 is operated as a motor, supplying the stator 24 with alternating electric current to exert on the carriage 23 (and therefore the rod 20) an axial driving force that moves it downward (i.e., toward the mold bottom 11), which corresponds to the zone B" in the diagrams of FIG. 7.

Then, the result of the axial forces exerted on the rod 20 is evaluated. In practice, this evaluation consists in measuring the value of the current consumed by the electric machine 21 operating as a motor. As long as the rod 20 encounters no obstacle on its descent, the consumed current is constant and corresponds to the nominal operating current (denoted i1) of the machine 21, necessary for the movement of the rod 20.

When the rod 20 reaches, at the time t1, the upper surface 12 of the mold bottom 11, the mold bottom forms a stop and prevents any advance of the rod 20. The result of the axial forces on the rod 20 then varies suddenly to be nullified, the force exerted by the mold bottom 11 on the rod 20 being equal in absolute value to the force exerted by the motor 21 on the rod 20 but of opposite sign.

This is reflected by a variation in the current consumed by the motor formed by the electric machine 21 operating as a motor. More precisely, the consumed current increases suddenly. The maximum attained value is denoted i2. As soon as this variation of the consumed current is detected, the following operations are performed, their order mattering little (these operations can even be simultaneous):

a position of origin Z0 (which can have a zero value), which here corresponds to the low position of the mold bottom 11, is assigned to the rod 20, and this position is stored in memory (for example in a memory incorporated into the central control unit 6);

the movement of the rod 20 is actuated to reposition it in the raised position by means of the electric machine 21 still operating as a motor, then (after a time delay) the movement of the mold bottom 11 toward its retracted position (or, in a variant, toward its extended position) is actuated by opening (or by closing) the solenoid valve 17 (position OP—or position CL—in FIG. 7).

In FIG. 7, the time at which the rod 20 reaches its raised position is denoted t2. Arbitrarily, the opening (or closing) actuation of the solenoid valve has been represented slightly in advance of the time t2.

This phase is denoted C" in the diagrams of FIG. 7.

When the rod 20 reaches its raised position, the operation of the electric machine 21 is switched to generator, which locks the rod 20 in position. After a time delay (optionally corresponding to a complete revolution of the wheel 4, phase D"), during which the rod 20 is held in its raised position by the machine 21 and during which the mold bottom 11 is held in its retracted (or extended) position, the movement of the rod 20 is actuated again, from a time denoted t3, toward the mold bottom by switching back the operation of the electric machine 21 to motor (phase E").

The result of the axial forces exerted on the rod 20 is then evaluated, in the manner indicated previously. As long as the rod 20 does not encounter the mold bottom 11, the consumed current is constant and corresponds to the operating nominal current (denoted i1) of the machine 21, necessary for the movement of the rod 20.

When the rod 20 reaches, at the time t4, the upper surface 12 of the mold bottom 11, the mold bottom forms a stop and prevents any advance of the rod 20. The result of the axial forces on the rod 20 then varies again suddenly to be nullified, the force exerted by the mold bottom 11 on the rod 20 being equal in absolute value to the force exerted by the motor formed by the machine 21 on the rod 20 but of opposite sign.

This is reflected by a variation in the current consumed by the electric machine 21 operating as a motor. More precisely, the consumed current increases suddenly to again reach i2. As soon as this variation of the consumed current is detected, a final position Z1 is assigned to the rod 20, which here corresponds to the raised (or low) position of the mold bottom 11, and this position is stored in memory (for example in a memory incorporated into the central control unit 6).

Then, the travel E of the rod 20 is calculated and stored in memory, which travel corresponds, as before, to the boxing travel:

$$E=|Z1-Z0|$$

A certain number of advantages result from the parameterizing method presented above.

First, before even starting the production, during the parameterizing of the installation 1, it is easily verified that the actual boxing travel corresponds, at each forming station 3, to the theoretical travel corresponding to the model of container to be formed.

Second, it is not necessary to instrument the mold bottom 11 since the information can be obtained indirectly by means of the stretching rod 20.

Third, the information thus obtained is reliable, since the rod 20 and the mold bottom 11 are coupled during the entire time of the movement of the mold bottom 11 from its extended position to its retracted position (or vice versa).

The result is a reduction of the risk of defect (even malformation) that affects the containers because of an error in adjusting the installation 1.

Since the verification of the boxing travel can be made in a systematic and automated way during the starting of the installation 1 before the start of the production, the parameterizing errors during changes in reference are thus limited.

The invention claimed is:

1. A method using a central control unit with a memory for operating an installation for manufacturing containers by stretch blow molding from blanks made of plastic material, where the installation includes a mold with a wall that defines a cavity bearing an impression of the container and extending along a main axis of the mold and with a mold bottom that is movable axially in relation to the wall between an extended position and a retracted position, a moving device configured to exert an axial thrust on the mold bottom to move the mold bottom from said extended position to said retracted position and vice versa, a stretching device with and electric machine and a stretching rod that is movable axially in relation to the wall, the stretching rod actuated by the electric machine, and a central control unit with a memory and in operative communication with the moving device and the stretching device, said operating method comprising:

from an initial configuration in which the stretching rod is in a raised position away from the mold bottom and in which the mold bottom is in one of said extended position and said retracted position, controlling the electric machine to operate as a motor to apply an axial driving force on the stretching rod that moves the stretching rod toward the mold bottom;

evaluating a result of axial forces exerted on the stretching rod;

on condition that a variation in the result of the forces is detected, determining and storing in the memory of the central control unit a position of origin for the stretching rod;

controlling the mold bottom to move toward the other of said retracted position and said extended position;

determining and storing in the memory of the central control unit a corresponding final position for the stretching rod; and calculating and storing in the memory of the central control unit a travel of the stretching rod as a distance between the final position and the position of origin.

2. The method according to claim 1, wherein, in the initial configuration, the mold bottom is in said extended position.

3. The method according to claim 2, further comprising:
between the determining and storing of the position of origin and the controlling of the mold bottom to move toward said retracted position, a step of ceasing to apply the axial driving force on the stretching rod.

4. The method according to claim 3, wherein the ceasing of the axial driving force on the stretching rod is includes a step of causing the electric machine to stop operating as a motor.

5. The method according to claim 4, wherein after the causing of the electric machine to stop operating as a motor and before the controlling of the mold bottom to move toward said retracted position, the electric machine is switched to operate as a generator.

6. The method according to claim 5, further comprising:
after the controlling of the mold bottom to move toward said retracted position, a predetermined time delay.

7. The method according to claim 4, further comprising:
after the controlling of the mold bottom to move toward said retracted position, a predetermined time delay.

8. The method according to claim 3, further comprising:
after the controlling of the mold bottom to move toward said retracted position, a predetermined time delay.

9. The method according to claim 2, further comprising:
between the determining and storing of the position of origin and the controlling of the mold bottom to move toward said retracted position, a step of repositioning the rod into said raised position.

10. The method according to claim 2, further comprising:
after the controlling of the mold bottom to move toward said retracted position, a predetermined time delay.

11. The method according to claim 2, further comprising:
comparing the travel of the stretching rod with a predetermined theoretical value.

12. The method according to claim 1, further comprising:
between the determining and storing of the position of origin and the controlling of the mold bottom to move toward the other of said retracted position and said extended position, a step of repositioning the stretching rod into said raised position.

13. The method according to claim 12, further comprising:
after the controlling of the mold bottom to move toward the other of said retracted position and said extended position, steps of:
moving the stretching rod from said raised position toward the mold bottom;
evaluating the result of the axial forces exerted on the stretching rod;
upon a variation in the result of the forces being detected, assigning said final position to the stretching rod.

14. The method according to claim 13, further comprising:

after the controlling of the mold bottom to move toward the other of said retracted position and said extended position, a predetermined time delay.

15. The method according to claim 13, further comprising:
comparing the travel of the stretching rod with a predetermined theoretical value.

16. The method according to claim 12, further comprising:
after the controlling of the mold bottom to move toward the other of said retracted position and said extended position, a predetermined time delay.

17. The method according to claim 12, further comprising:
comparing the travel of the stretching rod with a predetermined theoretical value.

18. The method according to claim 1, further comprising:
after the controlling of the mold bottom to move toward the other of said retracted position and said extended position, a predetermined time delay.

19. The method according to claim 1, further comprising:
comparing the travel of the stretching rod with a predetermined theoretical value.

20. The method according to claim 1,
wherein the evaluation of the result of the axial forces exerted on the stretching rod is accomplished by measuring a current consumed by the electric machine when operating as a motor, and
wherein the detection of the variation in the result of the forces exerted on the stretching rod is achieved by detecting a variation in the current consumed by the electric machine when operating as a motor.

* * * * *